United States Patent [19]
Kidder

[11] 3,755,613
[45] Aug. 28, 1973

[54] VIBRATION RESISTOR FOR OVERHEAD CONDUCTORS

[76] Inventor: Allan H. Kidder, P.O. Box 14, Lansdowne, Pa. 19050

[22] Filed: May 10, 1972

[21] Appl. No.: 252,062

[52] U.S. Cl. ............................ 174/42, 174/DIG. 12
[51] Int. Cl. ............................................... H02g 7/14
[58] Field of Search ..................... 174/42, DIG. 12

[56] References Cited
UNITED STATES PATENTS
| | | | |
|---|---|---|---|
| 2,729,054 | 1/1956 | Peterson | 174/42 UX |
| 3,007,243 | 11/1961 | Peterson | 174/DIG. 12 |
| 3,026,077 | 3/1962 | Peterson | 174/DIG. 12 |

FOREIGN PATENTS OR APPLICATIONS
| | | | |
|---|---|---|---|
| 107,602 | 3/1964 | Netherlands | 174/DIG. 12 |
| 728,241 | 4/1955 | Great Britain | 174/DIG. 12 |
| 805,872 | 12/1958 | Great Britain | 174/DIG. 12 |

*Primary Examiner*—Laramie E. Askin
*Attorney*—Zachary T. Wobensmith, II

[57] ABSTRACT

A vibration resistor is disclosed in which provision is made to retard vibration by mounting on the conductor an energy sink having a relatively short overlay of passive friction resistance imparting small strands mounted on the conductor with numerous contacts between the conductor and the small strands for wave energy absorption and disposal.

6 Claims, 4 Drawing Figures

PATENTED AUG 28 1973 3,755,613

VIBRATION RESISTOR FOR OVERHEAD CONDUCTORS

BACKGROUND OF THE INVENTION

1. Field of the Invention

This invention relates to wave dampers for overhead conductors and more particularly to dampers having sufficient vibration resistance to prevent accumulation of the momentun required to permit the development of waves having the high amplitude and low frequency which together characterize a condition that is commonly known as "galloping" of the conductors.

2. Description of the Prior Art

Overhead electric power transmission conductors, under certain atmospheric conditions, may be subject to low frequency high amplitude waves, a condition which is known as "galloping" of the conductors.

Vibration may be understood to be a standing wave phenomenon which will occur whenever some reasonably continuous source of energy input has sufficient net strength to exceed the friction energy loss from the affected span of conductor.

The portion of the energy input which has not been dissipated by friction must then accumulate naturally in the form of a standing wave train whose displacement velocity $dy/dt$ will increase until the respective rates of energy input and friction losses become equal at the limit $(dy/dt)$ max. $= V$.

During the time interval required to reach the steady-state limit $V$, an S-foot span of conductor having a mass of $w/g = m$ lb. sec$^2$/ft.$^2$ will have accumulated the following limit Q of standing-wave energy.

$$Q = \frac{m}{2} \int_0^s V^2 \sin^2 \rho x \, dx = \frac{mV^2S}{4}, \text{ ft. lb.} \quad (1)$$

Since the velocity V is directly proportional to the product of the vibration frequency $\omega/2\pi$ and amplitude A it may be seen quite readily, that the limit Q when $A = 0.04$ feet at 20 cycles per second, is identical to that for $A = 4.8$ feet at 1/6 cycles per second. This teaches that all of the wave energy required for high amplitude, low frequency "galloping" of a span will have been acquired at the natural aeolian vibration frequency of the span. This galloping in many instances has occurred when glaze or snow was present on the conductors. It has a frequency of the order of several seconds or less per cycle with an amplitude which may be as much as 12 feet.

The galloping phenomenon just referred to is different from aeolian waves which may have a frequency of the order of 20 to 50 cycles per second and amplitudes of about one inch maximum. The aeolian waves may cause fatigue effects noticeable only after many years but do not have the immediately destructive effect of the galloping waves.

It has heretofore been proposed to prevent vibration by the use of armor rods. The resultant increase in bending stiffness EI increases the steady-stage limit Q of potential galloping-wave energy which will be accumulated at any given frequency. Moreover the accompanying increases in bending strain will in some measure defeat the purpose for which the armor rods were intended.

The much more effective Stockbridge types of dampers however, do provide some passive resistance to conductor vibration. These devices can provide a considerable and often sufficient increase in the rate of wave energy disposal from a conductor, partly by utilizing the dynamic reaction of suspended mass to amplify the bending strains in the conductor near their supporting clamps. They have the disadvantage of becoming completely useless at frequencies below approximately five cycles per second. There is also a possibility that they will amplify bending strains beyond the fatigue limit of the conductor strands in certain cases, or beyond the endurance of the damper itself.

In U.S. Pat. No. 3,418,419, wave dampers for overhead transmission conductors are shown but these dampers are applied at a location of minimum displacement velocity $dy/dt$ and accordingly are of limited effectiveness. The structures employed are also relatively complex.

Various other structures have heretofore been proposed for suppressing or mitigating these galloping waves but none of these has proven satisfactory. Some of the prior structures did not appear to take into account the glaze or snow covered condition which may be present. Others of the prior structures did not provide adequate suppression, nor adequate energy absorption and dissipation in use.

SUMMARY OF THE INVENTION

In accordance with the invention provision is made for increasing the vibration resistance of a conductor by applying to a suspended conductor intermediate its supports a virtually insatiable energy sink for whatever mechanical energy may be supplied by the action of externally applied disturbing forces, the sink preferably comprising a relatively short overlay of passive friction imparting small strands mounted on the conductor.

It is the principal object of the invention to provide a vibration resistor which is simple but effective in action, will have a long useful life, and will not interfere with or adversely affect the electrical characteristics of the conductor.

It is a further object of the invention to provide a vibration resistor which will retain much of its maximum effectiveness over a wide range of vibration frequencies.

It is a further object of the present invention to provide a vibration resistor which will remain effective despite adverse weather conditions or the presence of ice deposits thereon.

A further object of the present invention is to provide a means for gaining essentially all of the economies of increased conductor tensions, while eliminating any further need for other types of dampers, energy absorbing conductor supports, or unconventional types of conductors.

Other objects and advantageous features of the invention will be apparent from the following description and claims.

BRIEF DESCRIPTION OF THE DRAWINGS

The nature and characteristic features of the invention will be more readily understood from the following description taken in connection with the accompanying drawings forming part thereof, in which.

It should, of course, be understood that the description and drawings herein are illustrative namely, and that various modifications and changes can be made in the structure disclosed without departing from the spirit of the invention.

Like numerals refer to like parts throughout the several views.

DESCRIPTION OF THE PREFERRED EMBODIMENTS

Figure 1:
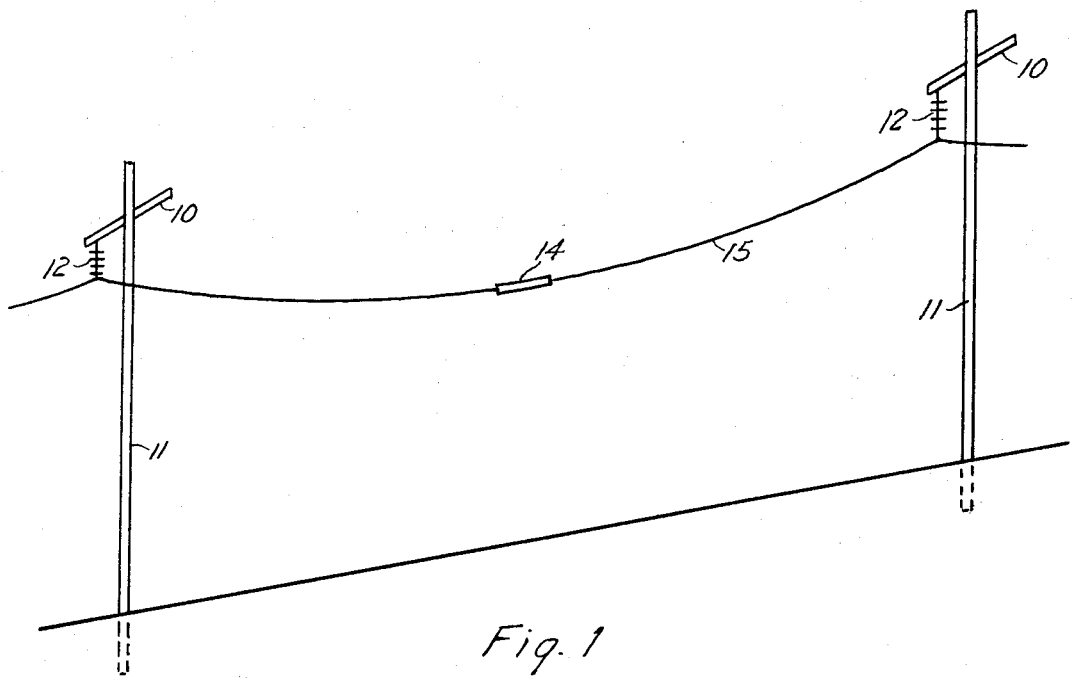
FIG. 1 is a view in elevation of one span of overhead conductor having the vibration resistor of the invention carried thereon at a preferred location.

Referring now more particularly to FIG. 1 of the drawings cross arms 10 carried on spaced poles or towers 11 have insulators 12 in supporting relation to a continuous metallic conductor 15 which may be of any well known type, including stranded conductors, elongated tubular or solid cylindrical conductors, and may be one of a bundle of conductors.

The effects of wave motion upon a stranded cable or electrical conductor may be explained most simply in terms of the bending strain associated with simple harmonic deflection such as may be represented by the expression: $y = -A \sin \omega t \sin \beta x$ in a standing wave. The corresponding bending strain in a strand at a perpendicular distance $z = r \sin \theta$ from a horizontal plane in which the bending strain is zero, may then be expressed as follows in terms of the effective bending radius $\rho$ .

$$z/\rho = z\, \delta^2 y/\delta x^2 = rA\beta^2 \sin \omega t$$
$$\sin \beta x \sin \theta, \text{ in strain units.} \tag{2}$$

where, $A$ is the maximum deflection, and $\beta$ is the phase-shift coefficient $\pi n/S = \omega(m/T)^{1/2}$, rad/ft, The standing waves of forced vibration have been seen to be the consequence of an accumulation of mechanical energy. Their formation can be explained as being a special case in which the successive reflections of some travelling wave train from the ends of a particular span overlap in a manner which creates the illusion of motion only in a direction that is perpendicular to the conductor axis. Since the flexural stiffness EI of overhead conductors has almost no effect upon their elastic reaction to vibrating deflections, the two principal parameters of their motion may be defined quite simply in terms of the distributed mass m and tension T of the conductor. The natural propagation velocity along the conductor is:

$$\overline{V} = dx/dt = (T/m)^{1/2}, \text{ in feet per second,}$$
$$\tag{3}$$

The characteristic impedance Z of the conductor to wave motion is the ratio of the instantaneous elastic reaction $e$ to the simultaneous value of $i = dy/dt$. It can be demonstrated that this constant parameter is represented by the following expression, $$Z = e/i = (Tm)^{1/2}, \text{ in lb. sec/ft.}$$
$$\tag{4}$$

The horizontal and/or vertical restraints of spacers between bundled conductors may of course introduce travelling wave reflections which require treating the energy accumulation $\Delta Q$ in each of the respective subspans as a sub-entity of the total energy accumulation Q in a bundled conductor span.

To identify the practical effect of friction resistance upon wave motion requires considering a short $\Delta x$-foot length of conductor having a resistance of $R\Delta x$ friction ohms, into which some travelling wave delivers energy at the rate $dW/dt = ei = Zi^2$ foot pounds per second. The rate $\Delta p$ at which energy will be dissipated from the $\Delta x$ foot segment will be $R\Delta x i^2$ foot pounds per second. Consequently there will be an incremental reduction in the rate of energy transfer through the segment, or an accompanying reduction $\Delta p$ in rate $p = ei$; while the ratio $e/i$ remains unaffected. The practical effect of friction resistance is thus seen to convert a fraction of the total wave energy into a readily disposable form of low grade heat; at a rate which will approach its maximum possible value $\Delta p = p$ when $R\Delta x = Z$.

The foregoing summary review of classical wave mechanics identifies the amount, but not the substance of the friction resistance $R\Delta x$ which would be required in order to prevent accumulation of vibration energy Q in a conductor. My invention concerns, therefore, the discovery and application of means for reducing any accumulation Q to a tolerable level.

As a first step, it will be understood that the average friction resistance R is a $\Delta x$ foot segment of conductor length, must represent the composite effect of numerous increments $dp$ of energy loss; each of which may be directly related to some bending stress hysteresis in a strand, or to bending strain induced rubbing action at some sliding contact between strands.

My investigation of these possibilities has disclosed that all of the effects of friction resistance upon overhead conductor vibration can be explained in terms of sliding friction between the two outside layers of strands in a conventional overhead conductor, as reported in my IEEE Conference Paper C 72 186-0 on Feb. 1, 1972. An extension of the analysis presented in that paper is required in order to identify the specific circumstances under which the bending srains in some $\Delta x$-foot segment of a conductor first become sufficient to overcome the retarding effect of some ambient and uniformly distributed static friction force $f$ per contact.

Each of the several retarding effects of $f$ may be appraised quite readily in terms of a phase displacement angle $\alpha$ whose sine is the ratio $f/H$, where for strands of stiffness $E\Delta a$ pounds, $$H = E\Delta az/\rho \text{ max.} = E\Delta ar A\beta^2 \text{ pounds max.}$$
$$\text{shear/contact.} \tag{5}$$

The principal effect of an ambient friction force f is that it establishes the respective limits $\alpha$ and $\pi-\alpha$, between which increments $dp$ of incident wave energy can be dissipated by sliding friction in a vibrating $S/n$ foot loop. This is because all contacts will remain static until $z/\rho = rA\beta^2 \sin\alpha$, and there can be no sliding friction after $z/\rho = rA\beta^2 \sin(\pi-\alpha)$. Sliding friction is therefore possible only between the limits $\alpha$ and $\pi-\alpha$. Even when $\alpha=0$ however, it can be shown that 95 percent of the rms displacement velocity ($V^2/2$) in each vibrating loop resides within $\pm S/6n$ feet from the crest. Therefore essentially all of the sliding friction losses $p$ must occur within a central segment $\Delta x$ whose length is very nearly, $$\Delta x = S/3n = \pi/3\omega_n \, (T)/(m)^{1/2} \text{ feet per loop.} \quad (6)$$

It can be shown that the effect of $\alpha$ upon the rate $p$ of sliding friction losses per loop is as follows:

$p = km\omega V^2 S/4 \, n \, F(\gamma\omega) \, F(\alpha)$ in ft.lb.sec.

where $$F(\alpha) = \frac{\overline{E^{-\gamma\omega\alpha/2\pi}} \, (\pi - 2\alpha + \sin 2\alpha) \cos 3\alpha}{\pi} \quad (7)$$

Therefore the average sliding friction resistance R in the active $\Delta x$ foot segment at the crest of a vibrating loop becomes $$R = 2p/V\Delta x = 3km \, \omega/2 \, \pi \, F(\gamma\omega) \, F(\alpha) \text{ in lb.sec./ft.}^2 \quad (8)$$

It can also be shown that the factor $\gamma$ is a reciprocal of the natural vibration frequency $\omega_n$ of a span; that $F(\gamma\omega) = \gamma\omega_o$ at the lowest resonant or galloping frequency $\omega_o$, and that $F(\alpha)$ is approximately equal to unity for all values of $f$ which are less than $H/5$. Therefore it is evident that a layer of strands making uniformly light contacts with the entire conductor surface will have a minimum distributed resistance $R_o$ which may be represented as follows:

$$R_o = \frac{3km\omega_o^2}{2\pi\omega_n}, \text{ sliding friction ohms per foot, minimum,} \quad (9)$$

and the total resistance of a $\Delta x$ foot segment at the wave crest will become, $$R_o\Delta x = \frac{k\omega_o^2(Tm)^{1/2}}{2\omega_n^2} = \frac{k\omega_o^2 Z}{2\omega_n^2} \text{ friction ohms, minimum,} \quad (10)$$

The constant $k$ can be shown to be entirely dependent upon the radius $r$ of the conductor surface and the diameter $d=br$ and lay $\phi$ of the outside strands according to the relationship, $$k = \frac{(2+b)^2(1+b)^4 \cos^2 \phi}{b^4}, \text{ where } \phi \tan^{-1} (2\pi r/u) \text{ for a layer of strands having a pitch of } u \text{ feet per 2 radians,} \quad (11)$$

and the number $N$ of strands in the layer is, $$N = \pi(2+b) \cos\phi/b \quad (12)$$

The relative size $b=d/r$ and number $N$ of loose strands required to provide a vibration resistance $R_o\Delta x=Z$, may now be found from equations 10, 11 and 12. In a conventional span of 795MCM ACSR conductor for example, it would be found that $R_o\Delta x=Z$ $k=56,000$ at $b=0.038$ and $\phi=81$ degrees. The required $k=2\omega_n^2/\omega_o^2$ may of course be obtained by selecting other values of $b$ and $\phi$ in equation 11. In this case however, it can be seen that a $\Delta x=2.7$ foot external layer of 26-No. 24AWG aluminum strands will be sufficient to prevent the accumulation of any signficant amount of standing wave energy Q in the span. The friction resistance of this particular $3\Delta x$ foot loop will then have been increased about 600 times, without requiring more than ten percent increase in its mass.

Figure 2:
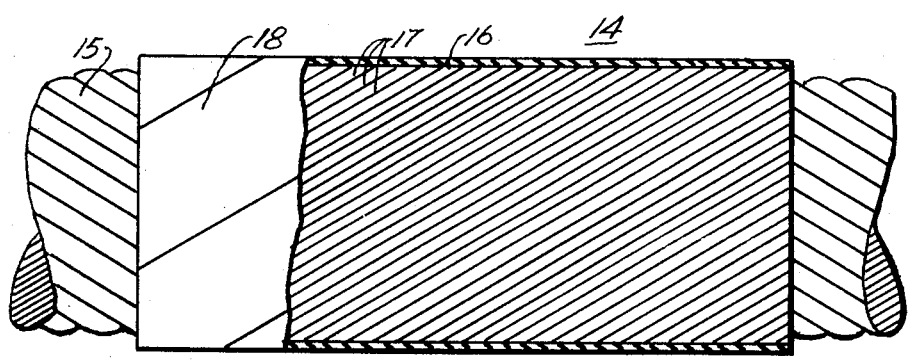
FIG. 2 is a view partly in elevation and partly broken away of a portion of a conductor with one form of a vibration resistor in accordance with the invention.

Referring now to FIG. 2 of the drawings, the conductor 15 which may in a specific embodiment be a 795MCM ACSR conductor is shown with vibration resistor 14 thereon with an external layer 16 of strands, consisting of 26-No. 24AWG aluminum strands 17 applied thereon to make uniformly light contacts for sliding friction with the entire surface of the conductor 15 and with a pitch of preferably less than fifteen conductor diameters per single turn of the strands 17 about the conductor axis. The angle of lay will be in the range from 10° to 89°. The most effective resistors will have a maximum practical stiffness $E\Delta a$ in strands 17 that are laid at an angle $\phi$ which is opposite to that of the outside srands of the conductor 15.

It will be noted that the relation of the strands 17 in the external layer 16 to the conductor 15 is such that the strands 17 have a diameter that is less than one sixth of the diameter of the conductor 16.

A mid-span location of the resistor 14 will not only assure achieving maximum damping power at the lowest resonant frequency of the span, but will be a load-center for all possible sources of wave energy input and distant from the ends of the span where $Zi^2$ equals zero.

The external layer of strands 17 can be applied to the exterior of the conductor 16 in any desired manner and retained in contact in any desired manner. It is preferred for retention and protection of the strands 17 to use an outer wrapper or cover 18 of a suitable weather and sun resistant elastomer such as synthetic rubber or plastic. The strands 17 may be partially embedded in or adhesively secured to the cover 18 for engagement with the conductor 15 with the cover 18 and strands 17 helically disposed on the exterior of the conductor 15 with partial overlapping of the cover 18 as desired. The wrapper or cover 18 provides desirable protection of layer 16 from mechanical displacement or injury and from accumulations of ice.

Figure 3:
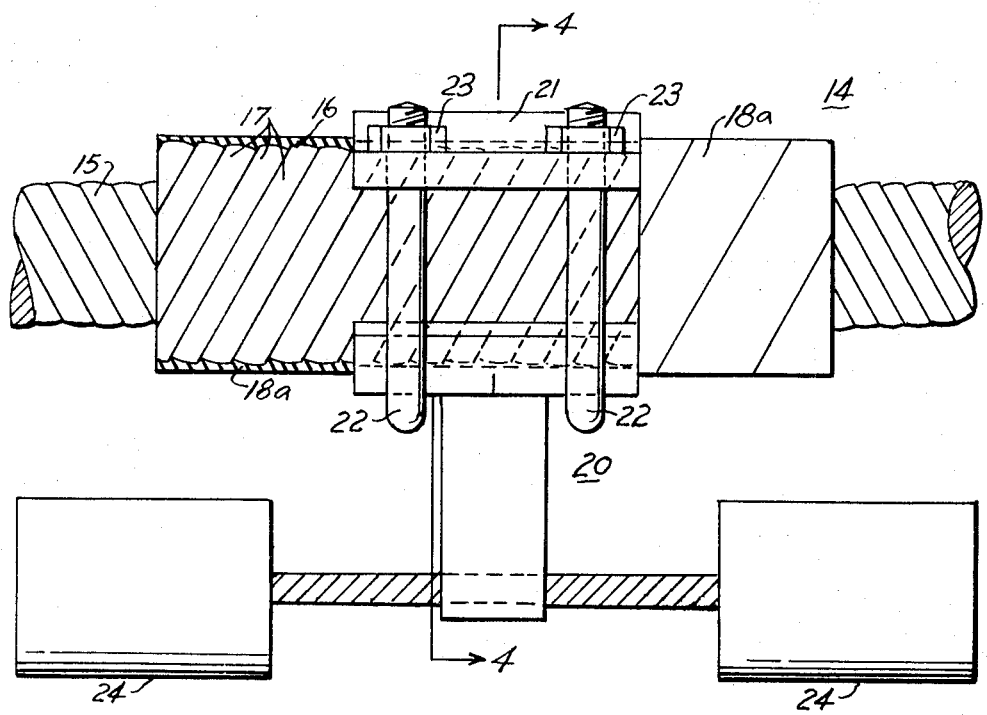
FIG. 3 is a view partly in elevation and partly in section of another form of vibration resistor in accordance with the invention and including a Stockbridge type damper.
Figure 4:
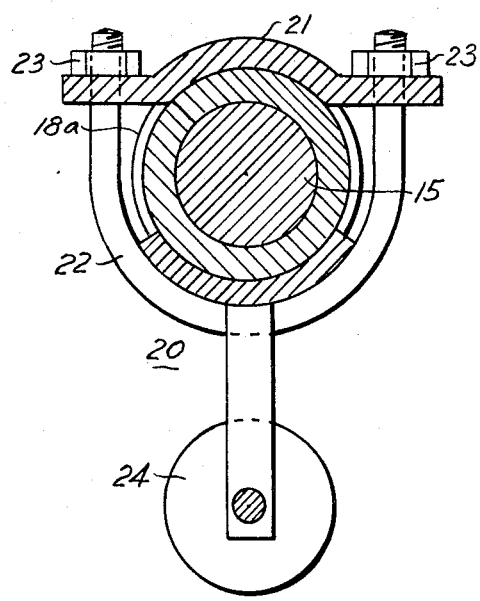
FIG. 4 is a vertical sectional view taken approximately on line 4—4 of FIG. 3.

Referring now to FIGS. 3 and 4 showing an embodiment of the invention in which the conductor 15 has an external layer 16 of strands 17 with an auxiliary passive resistance damper such as a Stockbridge type damper 20 secured thereon by clamps 21, U-bolts 22 and nuts 23 and with its pendant weights 24. The damping power of an otherwise ineffecitive stockbridge type damper 20 will be increased in approximately proportion to the supplementary friction resistance of strands 17. An elastomer cover 18$a$ similar to the cover 18 can be employed.

I claim:

1. Apparatus for resisting overhead conductor oscillations comprising
  a conductor having supports at spaced locations,
  a vibration resistor disposed intermediate a pair of said supports in engagement with said conductor and having a plurality of strands each of which is arranged to grip the conductor with a sliding friction fit which offers minimal resistance to slippage at the conductor surface.

2. Apparatus as defined in claim 11 in which
said conductor is a stranded conductor, and
said plurality of strands is disposed with an opposite hand to that of said conductor.

3. Apparatus as defined in claim 11 in which
said plurality of strands is restrained from mechanical displacement by an elastomeric cover in engagement with said plurality of strands.

4. Apparatus as defined in claim 11 in which
said plurality of strands consists of wires.

5. Apparatus as defined in claim 11 in which
the strands of said plurality have a diameter which is less than one sixth of the diameter of the conductor.

6. Apparatus as defined in claim 11 in which
an auxiliary passive resistance damper member is provided in clamped engagement intermediate the ends of said plurality of strands.

* * * * *

UNITED STATES PATENT OFFICE
CERTIFICATE OF CORRECTION

Patent No. 3,755,613     Dated August 28, 1973

Inventor(s) Allan H. Kidder

It is certified that error appears in the above-identified patent and that said Letters Patent are hereby corrected as shown below:

Column 1, line 9, "momentun" should read -- momentum --; line 62, "steady-stage" should read -- steady-state --. Column 5, line 3, the formula $$(V^2/2) \quad \text{should read} \quad (V^2/2)^{1/2}$$

line 15, the formula identified as (7) should read $$F(\alpha) = \dfrac{E - \dfrac{\gamma \omega \alpha}{2\pi}(\pi - 2\alpha + \sin 2\alpha)\cos^3 \alpha}{\pi}$$

line 22, the formula identified as (18) should read $$R = \dfrac{2p}{v^2 \Delta x} = 3 \dfrac{km\,\omega}{2\pi} F(\gamma\omega)\ F(\alpha) \text{ in lb. sec/ft.}$$

line 67, after "$R_o \Delta x$ Z" insert -- when --. Column 7, line 1, after "claim" the number "11" should read -- 1 --; line 5, after 'claim" the number "11" should read -- 1 --; line 9, after "claim" the number "11" should read -- 1 --. Column 8, line 1, after "claim" the number "11" should read -- 1 --; line 5, after "claim" the number "11" should read -- 1 --.

Signed and sealed this 29th day of January 1974.

(SEAL)
Attest:

EDWARD M. FLETCHER, JR.      RENE D. TEGTMEYER
Attesting Officer     Acting Commissioner of Patents